May 7, 1935. E. V. McTAGUE Re. 19,563
PRESSING MACHINE
Original Filed April 7, 1932 3 Sheets-Sheet 1
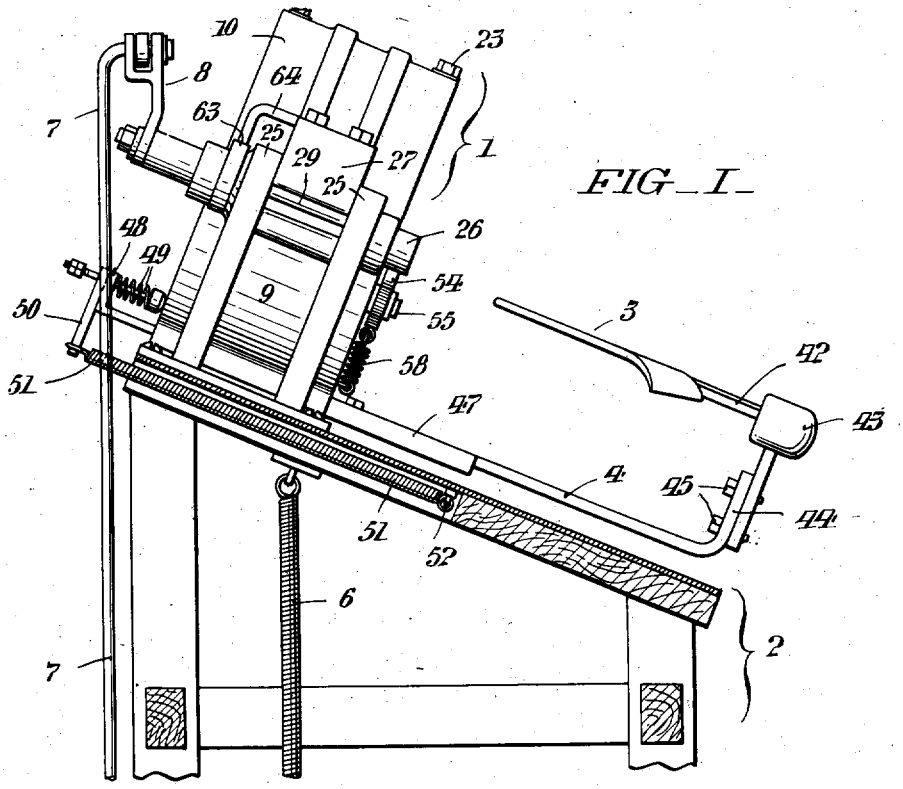
FIG. I.
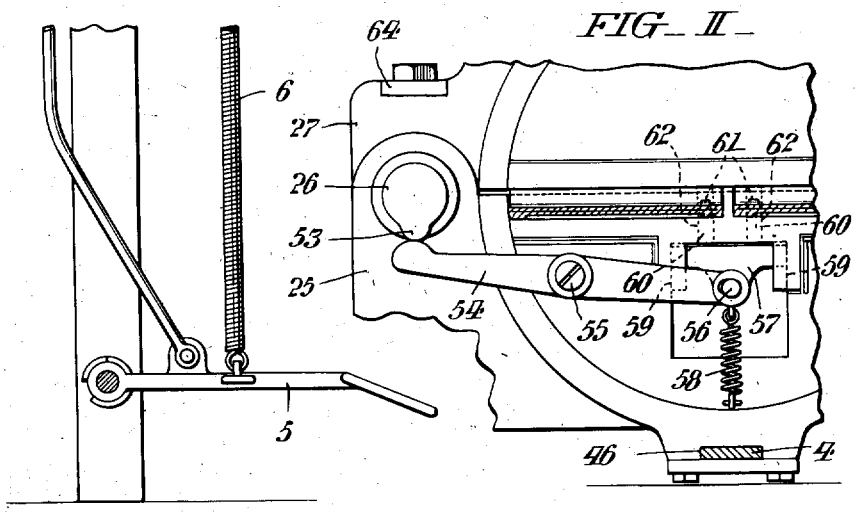
FIG. II.
WITNESSES:
Hubert Fuchs
William Bree, Jr.
INVENTOR:
Edward V. Mc Tague,
BY Fraley & Paul
ATTORNEYS.

May 7, 1935. E. V. McTAGUE Re. 19,563
PRESSING MACHINE
Original Filed April 7, 1932 3 Sheets-Sheet 2
FIG. III.
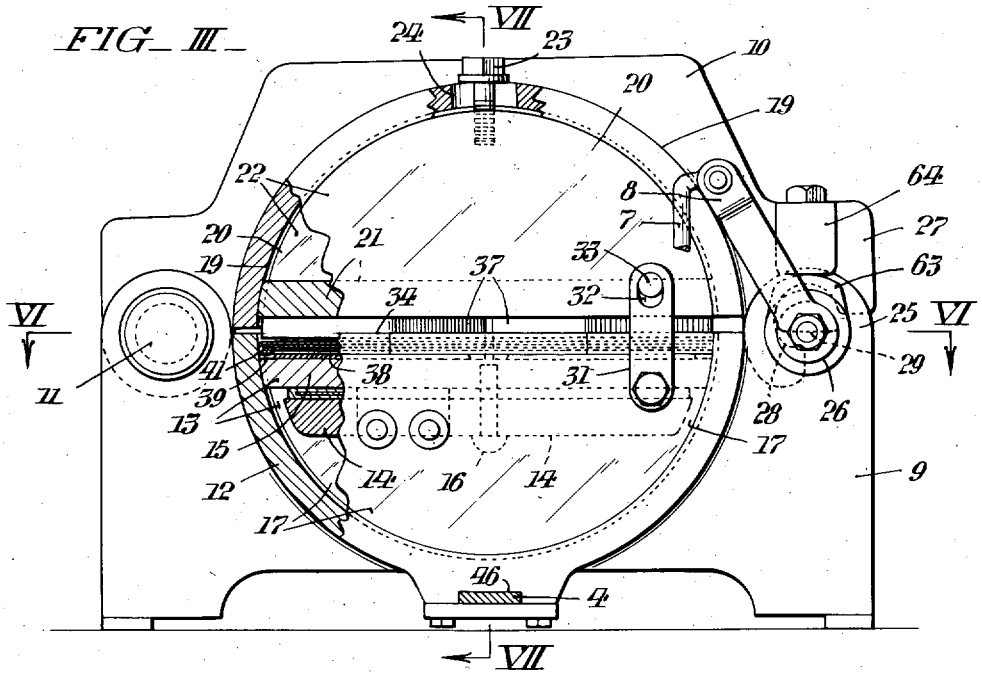
FIG. IV.
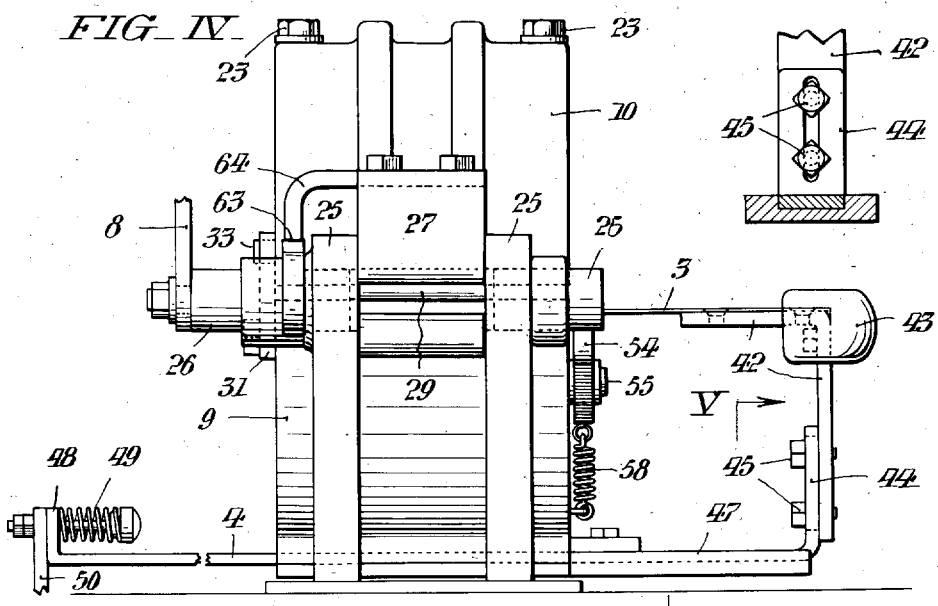
FIG. V.
WITNESSES:
Hubert Fuchs
William Bell, Jr.
INVENTOR:
Edward V. McTague,
BY Fraley & Paul
ATTORNEYS.

May 7, 1935. E. V. McTAGUE Re. 19,563
PRESSING MACHINE
Original Filed April 7, 1932 3 Sheets-Sheet 3
FIG. VI.
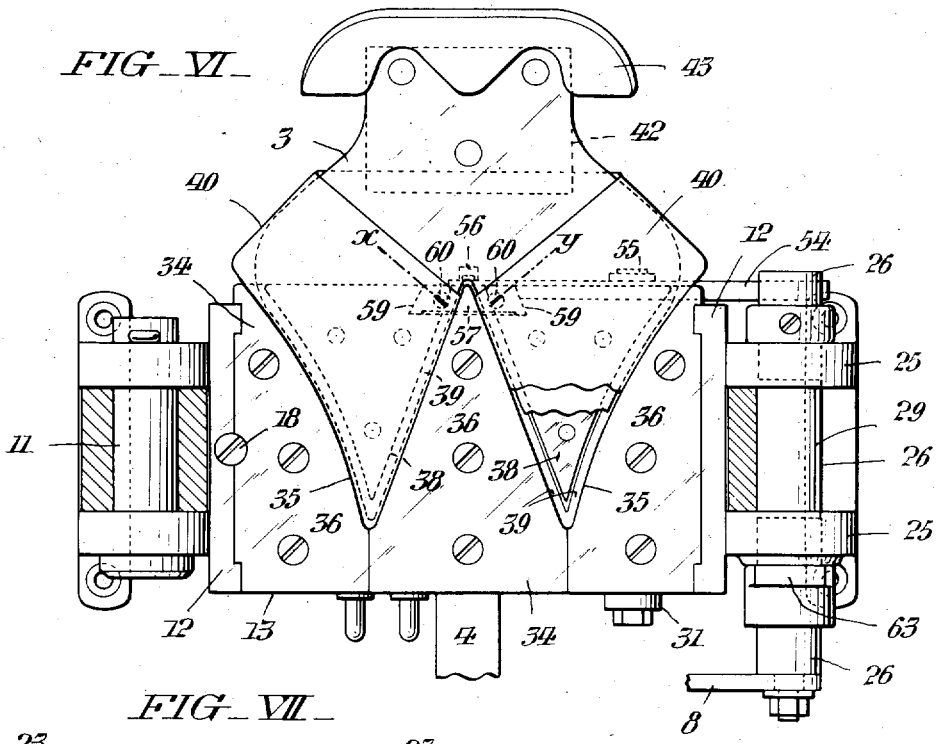
FIG. VII.
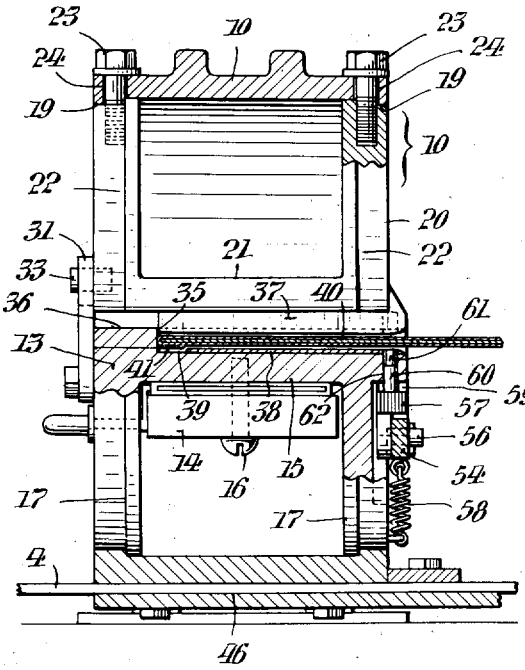
FIG. VIII.
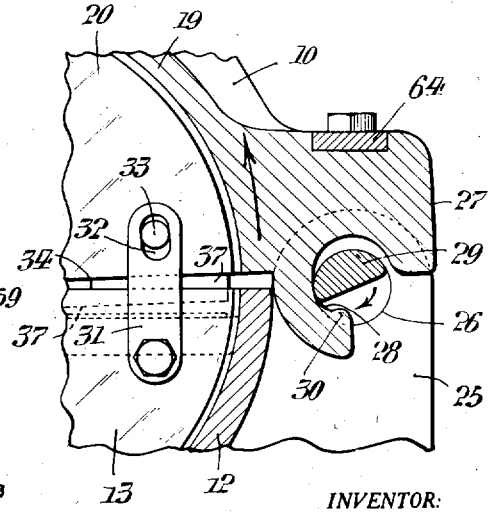
INVENTOR:
Edward V. McTague,
BY Fraley & Paul
ATTORNEYS.

Reissued May 7, 1935 Re. 19,563

UNITED STATES PATENT OFFICE 19,563

PRESSING MACHINE

Edward V. McTague, Millville, N. J., assignor to The Convertible Duplex Die Corporation, Millville, N. J., a corporation of New Jersey Original No. 1,890,882, dated December 13, 1932, Serial No. 603,692, April 7, 1932. Application for reissue June 12, 1933, Serial No. 675,498

13 Claims. (Cl. 223—55)

My invention, while relating generally to pressing machines, is especially directed to machines for pressing collar points, or other like articles of fabric, during the process of their manufacture.

One object of the invention is to provide a pressing machine characterized by pressing elements having a recess which is adapted to confine a garment point positioned therein to a predetermined shape while heat and pressure are applied to the garment point.

Another object of the invention is to provide a pressing machine of comparatively simple and inexpensive manufacture in which the pressing elements are closed together and separated with their opposing die faces having capacity for relatively free movement to adjust themselves to the fabric to be pressed but maintained in parallel relation at the limits of their movement facilitating the insertion and removal of the fabric. At the same time the pressing dies are preferably so mounted as to be readily removable so that sets of dies of various different shapes may be substituted for each other by a simple operation.

A further and more specific object of the invention is to provide in combination with pressing elements of such a nature, a device, suitably in the form of a cutter, which incident to the pressing operation causes a mark, preferably in the form of a perforation, to be made upon the fabric, this mark serving as a measurement for a succeeding trimming operation.

Another specific object of the invention is to provide a pressing mold so shaped as to cause double thickness edges of the fabric to be pressed out with a smooth surface on the outside.

Other objects and advantages characteristic of my invention will become more fully apparent from the description hereinafter of a particular example or embodiment thereof, the description having reference to the accompanying drawings. Of the drawings:

Fig. I represents a side elevation of a collar point pressing machine of my invention mounted on an inclined table.

Fig. II represents an enlarged fragmentary view of a portion of the machine showing special mechanism employed for marking the fabric with a cut at a predetermined point incident to the pressing operation.

Fig. III represents an enlarged rear view of the pressing machine with the table omitted.

Fig. IV represents an enlarged side elevation of the pressing machine.

Fig. V represents a cross section of the same, taken as indicated by the lines V—V of Fig. IV.

Fig. VI represents a cross section of the same, taken as indicated by the lines VI—VI of Fig. III, showing the position of the collar fabric before the pressing operation occurs, with a portion of the form to which the fabric is applied broken away for clearness of illustration.

Fig. VII represents a cross section of the same, taken as indicated by the lines VII—VII of Fig. III; and, Fig. VIII represents an enlarged rear view of a portion of the machine with certain parts removed for clearness of illustration.

With particular reference to Fig. I, there is shown in the drawings a collar point pressing machine, comprehensively designated at 1, mounted on an inclined table 2. The form to which the fabric is applied before insertion in the pressing machine is shown at 3, this form being attached to a guide member 4 which passes through the base of the pressing machine. The apparatus for operating the pressing machine, in the example shown, comprises a foot treadle 5 joined to the inclined table 2 by a spring 6. A connecting rod 7 is pivotally connected to the foot treadle 5 at one end and is similarly connected to a crank arm 8 at the other end.

With reference to Fig. III, in which a rear elevation of the pressing machine proper is illustrated, there is shown a stationary die holder 9, which may be bolted or otherwise secured to the top of the inclined table 2, and a movable die holder 10 which is pivotally joined to the stationary die holder by a pin 11. In an obvious manner, the movable die holder 10 is adapted to revolve about the pivot pin 11 toward or away from the stationary die holder 9. In the stationary die holder 9 a semi-cylindrical seat 12 is formed, into which a correspondingly shaped pressing die 13 is fitted. The stationary or bottom die 13 is hollowed at the inside, as indicated in Fig. VII, to afford a space for the accommodation of a heating unit 14. The heating unit 14 is affixed to the underside of the plate member 15 of the die 13 by means of screws 16. The semi-circular arms 17 depending from the plate member 15 engage within the arcuate seat 12 of the stationary die holder 9 with a neat fit. As shown in Fig. VI, the stationary pressing die 13 is desirably secured in place by a single screw 18 at the side thereof. When the screw 18 is withdrawn, the pressing die 13 can be readily removed in an obvious manner.

Within the upper or movable die holder 10 there is also formed a semi-cylindrical seat 19 into which is fitted a correspondingly shaped pressing die 20. The upper pressing die 20 is also formed with a flat plate member 21 having semi-circular arms 22. The upper pressing die 20 is freely mounted for rotation within its die holder 10 so that it can readily assume different positions therein. However, the extent of movement of the pressing die 20 within its die holder 10 is limited by means of a screw 23 which passes through a slot 24 in the top of the die holder 10.

On the opposite side of the stationary die holder 9 from that which carries the pivot pin 11, there are provided bearings 25 for a cam shaft 26. As clearly shown in Fig. III, the cam shaft 26 is connected at the rear of the machine to the crank arm 8 to which the previously described treadle mechanism is attached. The upper or movable die holder 10 is provided with a laterally projecting portion 27 formed with an interior curved cam surface as indicated at 28 in Fig. VIII. The surface 28 is so curved that with rotation of the cam shaft 26 the movable die holder 10 is forced downward. Thus when the cam shaft is rotated in a counter-clockwise direction, its cam 29 engages first the smoothly curved cam surface 28, and then the sharply rounded extremity 30, causing the movable die holder 10 to be forced downward gradually against the resistance of the fabric to be pressed toward the stationary die holder 9. On the other hand, when the cam shaft 26 is rotated in a clockwise direction, an additional cam 63 on the cam shaft 26, clearly shown in Fig. III, engages a block 64 on the projecting portion 27 of the movable die holder 10, causing the separation of the die holders in an obvious manner. Thus when the foot treadle 5 is pressed, the movable die holder 10 closes upon the stationary die holder 9, but with release of pressure on the foot treadle 5, through the action of the spring 6, the cam shaft 26 is rotated in the opposite direction separating the movable die holder 10 from the stationary die holder 9.

Attached to one of the depending arms 17 of the lower pressing die 13, there is a short link 31. The link 31 has at its upper end a slot 32 in which a pin 33 on the upper or movable die 20 is engaged. The link 31 causes the upper or movable die 20 to be maintained in substantially parallel relation with the lower or stationary die 13, at the limit of the separating movement. When the movable die holder 10 is urged downward by rotation of the cam shaft 26, its die 20 will tend to partake of the same angular movement about the pivot pin 11, but will be free to adjust itself to the fabric to be pressed. Moreover, when the movable die holder 10 is raised, its pressing die 20 will tend to partake of the angular movement of the die holder, but will be restrained by action of the link 31 and caused to assume a horizontal position. While the slot 32 of the link 31 is shown to be of elongated form, giving to the freely mounted die 20 a limited amount of play, it will be observed that at either limit of its movement the die 20 will assume a strictly parallel relation with the opposing die 13.

The lower or stationary die 13 presents a flat face 34 to the companion die. On the flat face 34 there are depressed areas 39 shaped to the form of collar points. At the edges between the depressed areas 39 and the adjacent raised areas 36, there are right angular surfaces 35, as shown in Fig. VII. The upper or freely mounted die 20 is formed with complementary raised surfaces 37 adapted to fit snugly upon the corresponding depressed surfaces 39 of the lower die 13. Thus the upper and lower dies 20 and 13 define between them a mold of the shape of two collar points. Preferably this mold is further provided with a thin flat plate 38, which in the example shown is riveted to the depressed surfaces 39 of the lower die, but which does not quite extend to the edges of the depressed surfaces 39 and hence forms recessed areas at the margins of the collar points when a collar fabric such as shown at 40 is inserted in the pressing machine. The recessed areas afford spaces for the accommodation of the extra thickness of material, as indicated at 41, at the margins of the collar points, so that when the pressing dies 13, 20 close together the collar points will be smoothly pressed on the outside with the extra thickness of material projecting at the inside.

Into the above described collar point mold the blade or form 3, shown in Fig. I, is inserted. The blade or form 3 is shaped to the form of the collar 40 to be pressed and fits nicely into the depressed areas 39 of the lower die 13. As shown in Fig. I, the blade or form 3 is adjustably supported on a metal strip 42 which has thereon a handle portion 43, and which is bent beneath the handle portion and there joined to the guide member 4. As shown in Figs. I and V, the guide member 4 has a slotted end 44 through which bolts 45 are inserted as a means of attaching the guide member 4 to the blade carrying strip 42. By the above described connection, the vertical position of the blade or form 3 may be adjusted to suit the convenience of the operator. The guide member 4 slides within a slot 46 at the base of the pressing machine, and at the base of the machine there is also provided an extension 47 having a similar aligned slot for the adequate support of the guide member 4. The guide member 4 passes through the pressing machine to the rear thereof and there terminates in an upturned end 48 which carries a shock absorbing spring 49. Attached to the upturned end 48 of the guide member 4, there is a depending bracket 50 to which is connected one end of a spring 51. The opposite end of the spring 51 is secured to the underside of the inclined table 2, as indicated at 52.

It will be apparent that when the blade or form 3 is moved into the pressing machine proper 1, the spring 51 is placed under tension, so that when the handle portion 43 is released the blade or form 3 will be automatically retracted to its original position. The shock absorbing spring 49 prevents any jarring of the machine when the blade or form 3 is retracted.

As shown in Fig. II, the cam shaft 26 is provided at the front end of the machine with an additional cam 53. The cam 53 operates upon one end of a lever 54 pivoted at 55. The inner end of the lever 54 engages a pin 56 which is affixed to a movable cutter 57. The inner end of the lever 54 is attached to the end of a spring 58, the other end of which is secured to the base of the pressing machine. The cutter 57, in the example shown, is of substantially rectangular outline and is slidable vertically within a correspondingly shaped groove, clearly indicated at 59 in Fig. VI. At the top of the cutter 57 there are two projections 60 which have sharp flat cutting edges 61 which penetrate through openings 62 in the face 34 of the bottom die 13. When a collar such as shown at 40 is inserted in the pressing machine, and the movable die 10 is operated to perform the pressing operation, rotation of the cam shaft 26, through the action of the lever 58, causes upward movement of the cutter 55, so that the cutting edges 61 of the projections 60 are caused to penetrate the fabric and to make cuts therein. These cuts or perforations are made in the directions of the dot-and-dash lines shown at x and y. The cuts thus made demark on the material to be pressed a predetermined measurement, so that when the collar fabric is later trimmed, the operator may use the cuts as a guide. Obviously, when the collar fabric 40 is inserted within the mold of the pressing machine, its position is determined so that the making of the cuts in the manner described measures the points at which the succeeding trimming operation is to be started.

As clearly shown in Figs. VI and VII the stationary die 13 is in the nature of a bed and the surfaces 35, referred to above, afford walls extending transversely to the plane of the bed and form a recess therewith. The recess closely follows in substantially abutting relation the edges of a garment point positioned therein and rigidly confines the garment point to a predetermined shape while heat and pressure are applied thereto. Moreover, the blade or form 3 is in the nature of a die which fits between the plies of the garment point, as illustrated in Fig. VII, and internally shapes and rigidly confines the garment point during the pressing operation; and the upper pressing die 20, having, as before stated, a contour complementary to the recess delineated by the wall surfaces 36, is receivable into said recess.

The operation of the pressing machine will be apparent from the above description. It will be especially noted, however, that the mutually opposing pressing dies 13, 20 assume a parallel relation to each other both when closed and when fully separated. Accordingly, the insertion and removal of the form 3 which carries the fabric is facilitated, and the fabric is smoothly pressed. In operation it is not necessary that the form 3 remain between the pressing elements of the machine during the pressing operation. The operator may first apply the collar fabric to the form 3, then push the form to a position between the upper and lower dies 13, 20. Then the operator may release his grip on the handle 43, permitting the form to be automatically retracted through action of the spring 51. Subsequently, the operator actuates the foot treadle 5, causing the freely mounted die 20 to move downward to effect the pressing of the fabric. At the same time the operator may use his hands to apply a new article to the form 3. Finally the operator removes the pressed article and repeats the operation on the second article.

While I have described in some details one particular example of a machine embodying my invention, it will be apparent that many changes may be made in the form of the various instrumentalities specifically shown and described herein, without departing from the spirit of the invention as defined in the annexed claims.

Having thus described my invention, I claim:

1. In a pressing machine of the character described, relatively movable die holders, pressing dies carried by said die holders having opposing faces, defining a pressing mold, one of said pressing dies being freely mounted within its die holder with capacity for limited movement therein, and means whereby incident to separation of the die holders the face of said latter die is caused to assume a parallel relation with the face of the other die.

2. In a pressing machine of the character described, die holders having capacity for relative angular movement, pressing dies carried by said die holders and having opposing faces defining a pressing mold, one of said pressing dies being freely mounted within its die holder with capacity for limited movement therein, and the other pressing die being fixed in its die holder, and means whereby incident to separation of the die holders the face of said freely mounted die is caused to assume a parallel relation with the face of the stationary die.

3. In a pressing machine of the character described, pivotally connected die holders, pressing dies carried by said die holders, one of said pressing dies being freely mounted within its die holder with capacity for limited movement therein, means for closing and separating said die holders, said means being operable to force said die holders gradually to a closed position against resistance of the material to be pressed, and means whereby incident to separation of the die holders the face of said latter die is caused to assume a parallel relation with the face of the other die.

4. In a pressing machine of the character described, pivotally connected die holders, one of said die holders being stationary and the other holder being movable about said pivotal connection, a pressing die fixed on said stationary die holder, an opposing pressing die freely mounted on said movable die holder, a cam operable to force said die holders to closed position, and means whereby incident to separation of the die holders said freely mounted die is caused to assume a parallel relation with the stationary die.

5. In a pressing machine of the character described, relatively movable die holders, pressing dies carried by said die holders, one of said die holders having an arcuate surface with the corresponding die holder seated freely thereon, means for closing and separating said die holders, and means whereby incident to separation of the die holders said freely mounted die is caused to assume a parallel relation with said stationary die.

6. In a pressing machine of the character described, pivotally connected die holders, pressing dies carried by said die holders having opposing flat faces, one of said die holders being movable and having an arcuate surface with the corresponding die holder seated freely thereon, and the other die holder and its die being stationary, means for closing and separating said die holders about said pivotal connection, and a link joining said freely mounted die with one of said stationary elements, whereby incident to separation of the die holders said freely mounted die is caused to move with its face maintained in parallel relation with the face of said stationary die.

7. In a pressing machine of the character described, pivotally connected die holders, opposing pressing dies carried by said die holders, one of said die holders being movable about said pivotal connection and having an arcuate surface with the corresponding die seated freely thereon, and the other die holder and its die being stationary, a cam for closing and separating said dies, and a link joining said freely mounted die with one of said stationary elements.

8. In a pressing machine of the character described, pivotally connected die holders, pressing dies carried by said die holders, one of said die holders being movable about said pivotal connection and having an arcuate surface with the corresponding die seated freely thereon and having a projection with a cam surface thereon, a cam shaft on said stationary die holder operable to close and separate said die holders, and a link joining said freely mounted die with one of said stationary elements.

9. In a pressing machine of the character described, relatively movable die holders, pressing dies carried by said die holders having flat opposing faces with complementary raised and depressed surfaces and right-angular edges therebetween, one of said pressing dies being freely mounted within its die holder with capacity for limited movement therein, means for opening and closing said die holders, and means whereby incident to separation of the die holders the face of said freely mounted die is caused to assume a parallel relation with the face of the other die.

10. In a pressing machine of the character described, relatively movable die holders, pressing dies carried by said die holders having opposing faces defining a pressing mold, one of said pressing dies being freely seated within its die holder with capacity for limited movement therein, and the other die being fixed in place within its die holder with capacity for ready removal, and means connecting one die with the other whereby incident to relative movement of the die holders the faces of said dies are caused to assume a parallel relation with each other.

11. In a pressing machine of the character described, relatively movable opposing pressing elements having complementary faces with raised and recessed portions defining a mold for the material to be pressed, and means movable across said pressing mold and operated by the movement of one of said pressing elements for marking a predetermined measurement on the material.

12. In a pressing machine of the character described, a movable pressing element, a stationary pressing element, said elements having complementary faces with raised and recessed portions defining a mold for the material to be pressed, a cam shaft for closing said movable pressing element on said stationary pressing element, and means movable across said pressing mold and operated by said cam shaft for marking with a perforation a predetermined measurement on the material.

13. In a garment point forming machine, a bed, walls extending transversely to the plane of the bed and forming a recess adapted to confine and substantially abut the edges of a garment point positioned therein and confine the same to a predetermined shape, means for positioning a garment point within said recess, means for applying heat to a garment point positioned in said recess, and means for applying pressure to said garment point, said latter means including a die holder mounted for vertical movement relative to the bed, and a die mounted for rotation therein about an axis substantially parallel to the plane of the bed thereby to adjust itself to the garment point to be formed.

EDWARD V. McTAGUE.